US005734260A

United States Patent [19]

Tasdighi et al.

[11] Patent Number: 5,734,260

[45] Date of Patent: Mar. 31, 1998

[54] SHORT-CIRCUIT PROTECTION CIRCUIT

[75] Inventors: Ali Tasdighi, San Jose; Phong Nguyen, Pleasanton, both of Calif.

[73] Assignee: TelCom Semiconductor, Inc., Mountain View, Calif.

[21] Appl. No.: 703,231

[22] Filed: Aug. 26, 1996

[51] Int. Cl.$^{6}$ .................................. G05F 3/16; H02H 7/20

[52] U.S. Cl. .................................. 323/312; 361/18

[58] Field of Search .................................. 323/312, 313, 323/314, 315, 316; 361/18, 88, 93, 98, 94; 327/310, 327, 328

[56] References Cited

U.S. PATENT DOCUMENTS 4,567,537 1/1986 Kalkhof et al. .................. 361/18

5,272,432 12/1993 Nguyen et al. .................. 323/315

5,339,019 8/1994 Benz .................. 323/286

*Primary Examiner*—Adolf Berhane

*Attorney, Agent, or Firm*—Skjerven, Morrill, MacPherson, Franklin & Friel; Brian D. Ogonowsky; Edward C. Kwok

[57] ABSTRACT

A short-circuit protection circuit senses the output current of an output transistor to provide a control signal to a control transistor. The control transistor, in response to the control signal, varies an input voltage to an internal stage of an amplifier driving the output transistor, so as to cause the output transistor is switched off. A hysteresis resistor is coupled in series with an input terminal of the short circuit protection circuit, so as to prevent transient noise from switching off said output transistor.

6 Claims, 3 Drawing Sheets

SHORT-CIRCUIT PROTECTION CIRCUIT

BACKGROUND OF THE INVENTION

1. Field of the Invention

The present invention relates to electronic circuits, e.g. integrated circuits. In particular, the present invention relates to a protection circuit for a high current output device.

2. Discussion of the Related Art

A current mode device capable of high current output must provide short-circuit protection to avoid permanent damage to the output stage in the event of a short circuit.

SUMMARY OF THE INVENTION

The present invention provides short-circuit protection to a circuit having a high current output transistor. The output transistor is driven by a first amplifier which includes an internal stage. The internal stage amplifies an input signal of this first amplifier so as to control the output current of the output transistor. The short-circuit protection circuit includes (a) a control transistor; (b) a current-sensing resistor coupled to sense current in the output transistor; and (c) a second amplifier which senses a voltage drop across the current-sensing resistor to control the control transistor. The second amplifier, which can be implemented by a current comparator, switches on the control transistor when the voltage drop across the current-sensing resistor is greater than a predetermined value. When the control transistor conducts, current is drained from the internal stage of the first amplifier, thereby switching the output transistor off. Because the short circuit condition can be detected by a current comparator, which has the desirable characteristic of fast switching, such a short-circuit protection circuit can operate with small voltage swings and low power supply ($V_{in}$) voltages.

In one embodiment, the high current output device is a constant voltage output circuit, which output voltage is set by a bandgap voltage. In another embodiment, the control transistor varies the input voltage of the internal stage of the first amplifier to switch off the output transistor.

In yet another embodiment, a "hysteresis" resistor is inserted in series with one input of the second amplifier to prevent noise in the high output current device from excessively switching the output transistor on and off.

The present invention is better understood upon consideration of the detailed description below and the accompanying drawings.

DETAILED DESCRIPTION OF THE PREFERRED EMBODIMENTS

Figure 1:
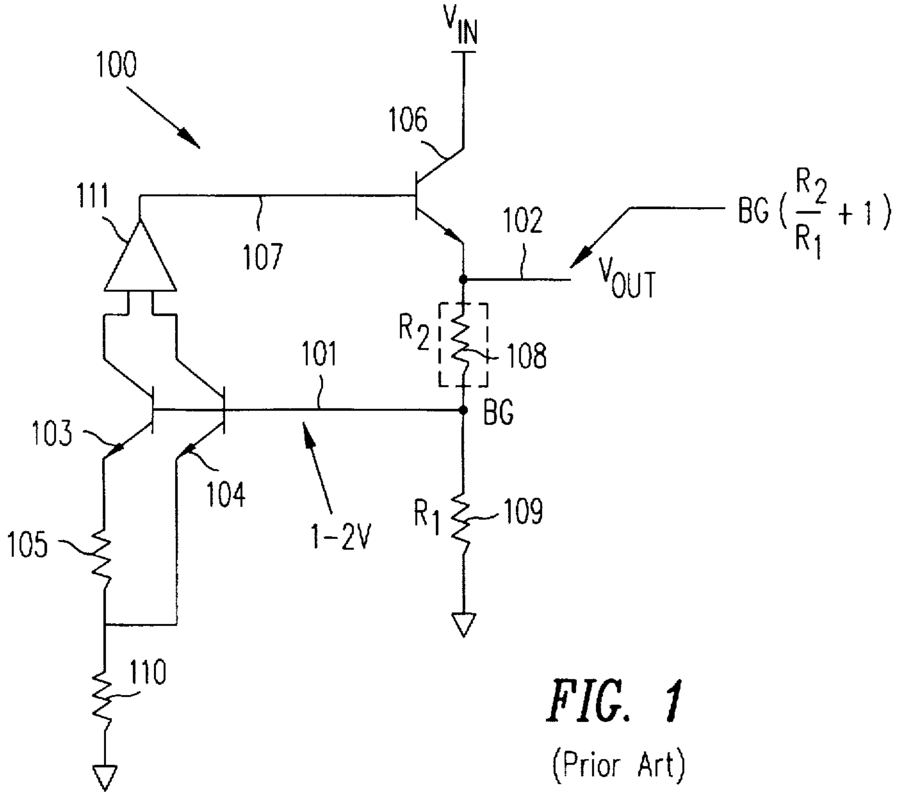
FIG. 1 (Prior Art)
FIG. 1 shows a constant output voltage circuit 100 to which the present invention is applicable.

The present invention provides short-circuit protection for any output circuit, such as constant output voltage circuit 100 of FIG. 1. As shown in FIG. 1, constant output voltage circuit 100 provides both a bandgap voltage $V_{BG}$, at terminal 101, and an output voltage $V_{out}$, at terminal 102. Resistor 105 and NPN transistors 103 and 104 provides bandgap voltage $V_{BG}$ (e.g. ~1.2 volts) by suitably choosing the sizes for transistors 103 and 104, and the resistance for resistor 105. The current differential between NPN transistors 103 and 104 is amplified by amplifier 111. Amplifier 111 provides an output voltage at the base terminal 107 of output transistor 106. Output transistor 106 provides at its emitter terminal 102 the output voltage $V_{out}$ over a range of output currents. Because of the large gain of amplifier 111, output voltage $V_{out}$ is given by the ratio of resistors 108 and 109, provided between terminals 101 and 102, and between terminal and ground:

$$V_{out} = V_{BG}\left(\frac{R_2}{R_1} + 1\right)$$

However, without short-circuit protection, an excessively large current drawn from terminal 102 may cause irreversible damage to output transistor 106.

Figure 2:
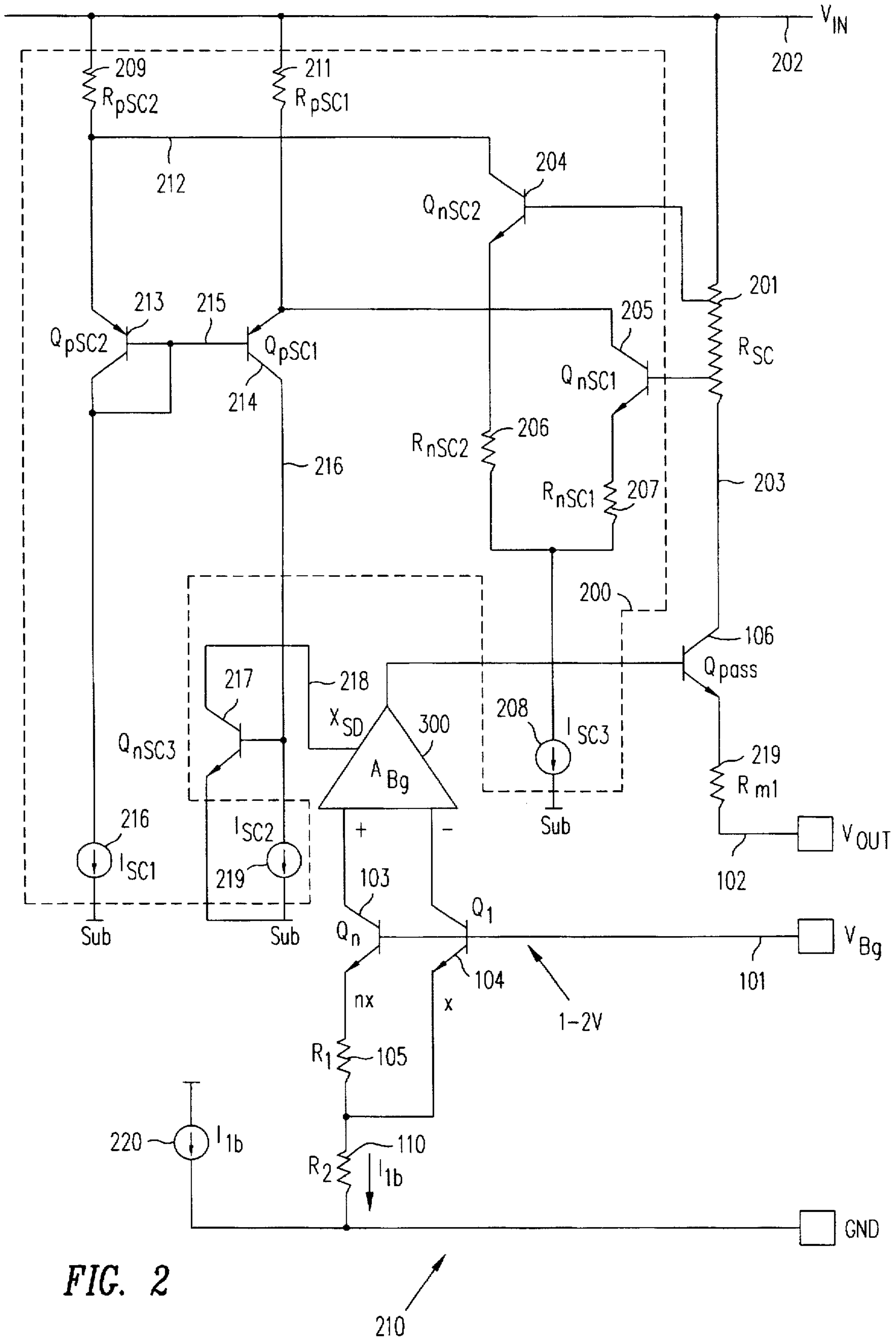
FIG. 2 shows an embodiment of the present invention, in a constant voltage output circuit 210, showing in detail short-circuit protection circuit 200.

The present invention provides a short-circuit protection circuit. FIG. 2 shows a constant voltage output circuit 210, showing in detail short-circuit protection circuit 200. To simplify the following discussion, like elements in FIGS. 1–4 are provided like reference numerals. As shown in FIG. 2, a resistor 201 is provided between power supply voltage $V_{in}$ and output transistor 106. The differential voltage across resistor 201 is provided to the base terminals of NPN resistors 204 and 205, to divide the current in current source 208 between resistors 206 and 207. In this embodiment, resistors 206 and 207 are ratioed such that $R_{206}$ (i.e. the resistance of resistor 206) is greater than $R_{207}$ (i.e. the resistance of resistor 207). Consequently, under normal operation, the current in NPN transistor 205 is much greater than the current in NPN transistor 204. When a large ("short-circuit") current is drawn at terminal 102, a larger current flows in NPN transistor 204 than in transistor 205. Since the current in NPN transistor 204 is provided by resistor 209, which is coupled between power supply voltage $V_{in}$ and node 212, the voltage at node 212 falls towards ground voltage. Thus, the common base terminal 215 of PNP transistors 213 and 214 is correspondingly lowered, since PNP transistor 213 is connected in a diode-follower configuration. The lowered voltage at base terminal 215 of PNP transistor 214 raises the voltage at base terminal 216 of NPN transistor 217, thereby increasing the current in collector terminal 218 of NPN transistor 217. When a sufficiently large current is drawn at collector terminal 218, current mode amplifier 300 shuts off output transistor 106 to provide a short-circuit protection. Because the short circuit condition is detected by a current comparator (i.e. the current comparator formed by resistors 209 and 211, PNP transistors 213 and 214 and current sources 219 and 220), which has the desirable characteristic of fast switching, short-circuit protection circuit 200 can operate with small voltage swings. In fact, short-circuit protection circuit 200 can operate under low power supply ($V_{in}$) voltages.

Figure 3:
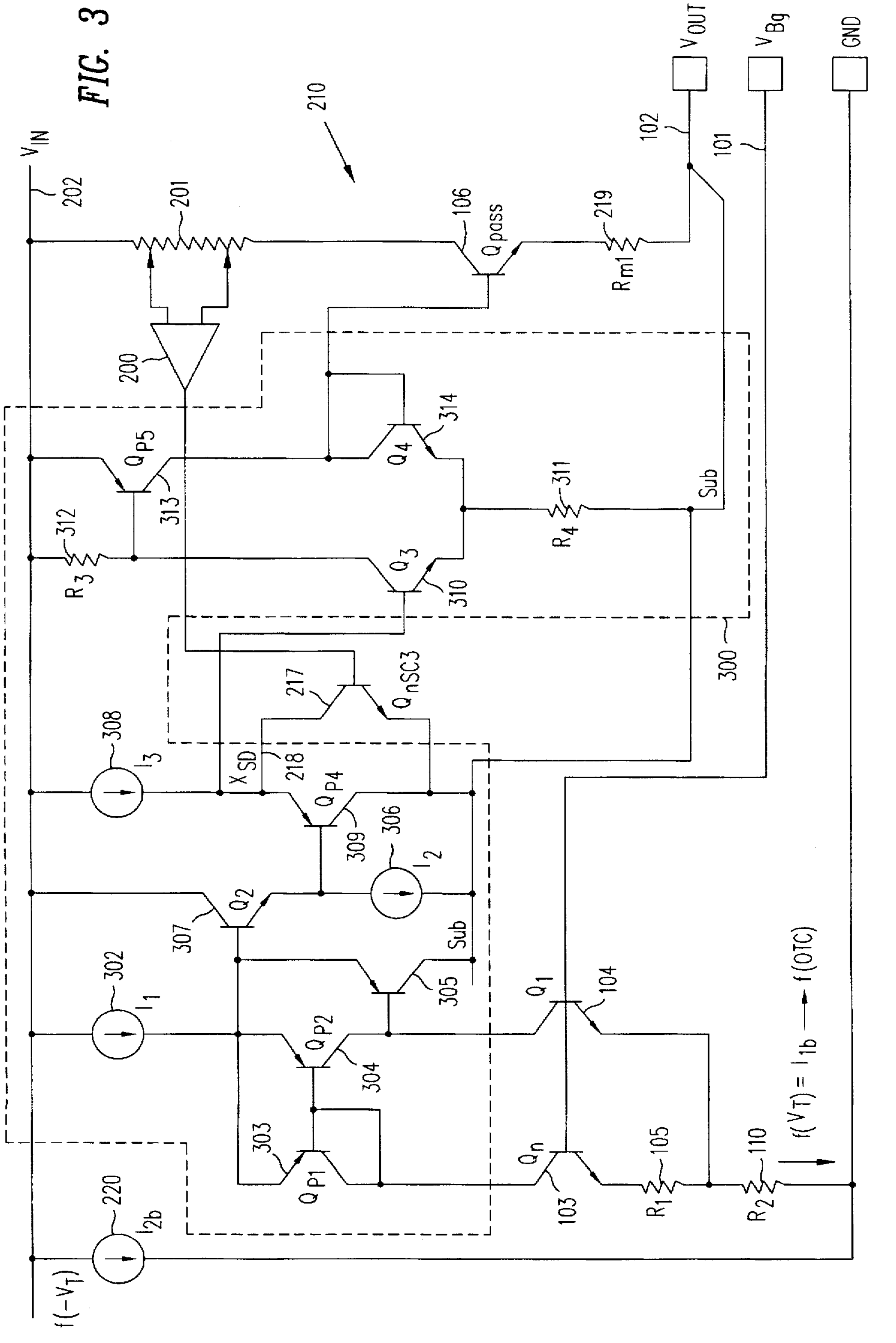
FIG. 3 shows constant voltage output circuit 210, showing in detail amplifier circuit 300.

One implementation of constant output voltage circuit 210 is shown in FIG. 3, showing in detail current mode amplifier 300. Referring to FIG. 3: since NPN transistor 217 and PNP transistor 309 divide the current in current source 309, when NPN transistor 217 draws a large current, the current drawn by PNP transistor 309 is diminished. Because NPN transistor 217 is designed to have a lesser on-resistance than PNP transistor 217, the voltage at the base terminal of NPN transistor 310 falls as a result of the large current in NPN transistor 217, shutting off NPN transistor 310 and PNP transistor 313. NPN transistor 314, which is diode-connected, turns off output transistor 106 to provide the short-circuit protection.

After output transistor 106 turns off, the voltage drop across resistor 201 goes to zero. Consequently, most of the current in current source 208 is provided by NPN transistor 205 (see FIG. 2), because of the relative resistances of resistors 206 and 207. With NPN transistor 204 conducting a very small or no current, the common voltage at the base terminals of PNP transistor 213 and PNP transistor 214 is substantially given by $V_{in}-I_{SC}*R_{209}-V_{BE}$, where $I_{SC}$ is the current in current source 220, $R_{209}$ is the resistance of resistor 209, and $V_{BE}$ is the base-emitter voltage drop of PNP transistor 213. Since NPN transistor 205 draws the current of current source 208 through resistor 211, thereby pulling the voltage at the emitter terminal of PNP transistor 214 down, PNP transistor 214 is switched off at this base voltage. As a result, the voltage at base of NPN transistor 217 shifts down, thereby increasing the base voltage of NPN transistor 310 (see FIG. 3) and pulling the base voltage of PNP transistor 313 down. Consequently, a larger current flows in diode-connected NPN transistor 314, thus lifting the voltage at the base terminal of output transistor 106 to enable NPN transistor 106 to return to normal operation. The substantially constant voltage $V_{BG}$ provides a substantially constant bias on at the base terminal of PNP transistor 309.

Figure 4:
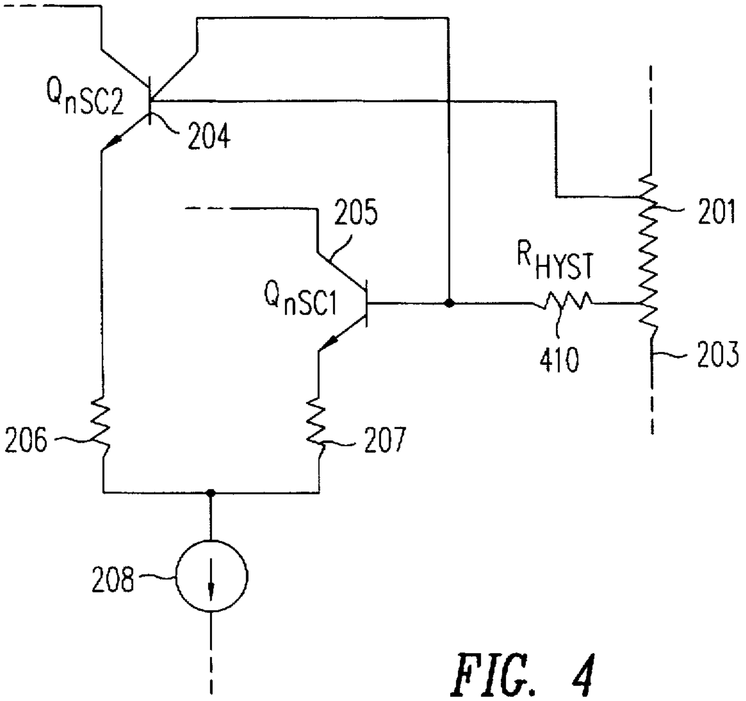
FIG. 4 shows a variation in constant voltage output circuit 210, showing inclusion of resistor 410 to provide "hysteresis".

To prevent output transistor 106 from being turned-on and turned-off excessively by noise (e.g. transient currents), a "hysteresis" resistor 410 can be included in constant voltage output circuit 210 between terminal 203 and the base terminal of NPN transistor 205. This variation of constant voltage output circuit 210 is shown in FIG. 4, showing the input stage of amplifier 200, where hysteresis resistor 410 is inserted between terminal 203 and the base terminal of NPN transistor 205.

The above detailed description is provided to illustrate the specific embodiments of the present invention and is not intended to be limiting. Numerous variations and modification within the scope of the present invention are possible. The present invention is defined by the following claims.

We claim:

1. A circuit having an output transistor, said output transistor having a control terminal, a current input terminal, and a current output terminal, said circuit comprising:
   - a first amplifier receiving a first input signal, said first amplifier coupled to said control terminal of said output transistor to provide an output current according to the magnitude of said first signal, said first amplifier having an internal stage for amplifying said first signal to drive said control terminal of said output transistor;
   - a control transistor having a control terminal, a current input terminal and a current output terminal, said control transistor coupled between said internal stage and said current output terminal of said output terminal of said output transistor, said control transistor, in response to an asserted control signal received at said control terminal of said control transistor, draining current from said internal stage;
   - a current-sensing resistor coupled between said current input terminal and a reference voltage source; and
   - a second amplifier, having first and second input terminals coupled to said current-sensing resistor to sense a voltage drop across said resistor and having an output terminal coupled to said control terminal of said control transistor, such that when said voltage drop across said resistor exceeds a predetermined value, said second amplifier provides an output voltage at said output terminal of said second amplifier to assert said control signal.

2. A circuit as in claim 1, said circuit further comprising a constant voltage output circuit, said first signal being a bandgap voltage.

3. A circuit as in claim 1, wherein said control transistor changes the input voltage of said internal stage in response to said asserted control signal.

4. A circuit as in claim 1, wherein a hysteresis resistor is coupled in series with one of said first and second input terminals of second amplifier.

5. A circuit as in claim 1, wherein said first amplifier comprises a differential amplifier.

6. A circuit as in claim 1, wherein said second amplifier comprises a differential amplifier.

* * * * *